US009652489B2

(12) United States Patent
Vijayasekaran et al.

(10) Patent No.: US 9,652,489 B2
(45) Date of Patent: May 16, 2017

(54) COMPLIANCE VERIFICATION SYSTEM (71) Applicant: Bank of America Corporation, Charlotte, NC (US)

(72) Inventors: Vimal Vijayasekaran, Charlotte, NC (US); Rathi Kaliyan, Tamil Nadu (IN); Rajesh Ramanathan, Tamil Nadu (IN); Arthi Ramraj, East Hartford, CT (US); Masthanbee Shaik, Manchester, CT (US)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 14/468,510

(22) Filed: Aug. 26, 2014

(65) Prior Publication Data
US 2016/0063049 A1  Mar. 3, 2016

(51) Int. Cl.
*G06F 17/30* (2006.01)
(52) U.S. Cl.
CPC .............................. *G06F 17/30371* (2013.01)
(58) Field of Classification Search
CPC .. G06F 17/30371; G06F 17/30; G06F 19/345; G06F 19/3406; G06F 19/3418; G06F 17/30867; G06F 17/30477; G06F 17/30528; G06F 17/30241; G06F 19/3456; G06F 19/3487; G06F 19/10; G06F 19/18; G06F 19/20; G06Q 10/10; G06Q 50/01
See application file for complete search history.

(56) References Cited

U.S. PATENT DOCUMENTS

| | | | |
|---|---|---|---|
| 6,512,986 B1* | 1/2003 | Harmon | A61B 5/0002 702/81 |
| 6,820,069 B1* | 11/2004 | Kogan | G06Q 40/06 706/45 |
| 2006/0288183 A1* | 12/2006 | Boaz | G06F 11/1451 711/164 |
| 2007/0061125 A1* | 3/2007 | Bhatt | G06F 21/577 703/20 |
| 2008/0040610 A1* | 2/2008 | Fergusson | G06Q 40/02 713/182 |
| 2008/0059220 A1* | 3/2008 | Roth | G06Q 10/10 705/311 |
| 2010/0281020 A1* | 11/2010 | Drubner | G06F 17/30424 707/722 |

(Continued)

*Primary Examiner* — Anh Ly
(74) *Attorney, Agent, or Firm* — Michael A. Springs (57) ABSTRACT In one embodiment, a system including a memory and processor is provided. The memory stores a plurality of quality rules and control rules. The processor receives a request comprising a plurality of parameters and data elements. The processor determines that the request is missing a first data element and that a second data element of the plurality of data elements is corrupt. The processor determines that a first number of data elements should have been communicated and a third number of data elements should have been processed. The processor determines that a second number of data elements were communicated and a fourth number of data elements were processed. The processor generates a report indicating that: the plurality of parameters is missing the first data element, the second data element is corrupt, the first number is less than the second number, and the fourth number is less than the third number.

16 Claims, 3 Drawing Sheets

(56) References Cited

U.S. PATENT DOCUMENTS

| | | | | |
|---|---|---|---|---|
| 2010/0317420 A1* | 12/2010 | Hoffberg | ............ | G06Q 30/0207 463/1 |
| 2012/0023237 A1* | 1/2012 | Lurie | .................... | H04L 5/0035 709/226 |
| 2012/0095930 A1* | 4/2012 | Rider | .................. | G06Q 30/018 705/317 |
| 2012/0124197 A1* | 5/2012 | Ghai | ....................... | H04L 43/12 709/224 |
| 2013/0073594 A1* | 3/2013 | Jugulum | ........... | G06F 17/30303 707/802 |
| 2014/0101046 A1* | 4/2014 | O'Connor | .............. | G06Q 20/12 705/44 |
| 2014/0180711 A1* | 6/2014 | Kamen | .................. | G06Q 10/06 705/2 |
| 2014/0287353 A1* | 9/2014 | Sakamoto | .......... | G03G 9/08755 430/105 |
| 2015/0026027 A1* | 1/2015 | Priess | .................... | G06Q 40/00 705/35 |
| 2015/0170501 A1* | 6/2015 | Mukherji | ............... | G06Q 50/10 340/573.1 |
| 2015/0363437 A1* | 12/2015 | Florez | ............... | G06F 17/30303 707/692 |

\* cited by examiner

COMPLIANCE VERIFICATION SYSTEM

TECHNICAL FIELD

This disclosure relates generally to a system for verifying data compliance.

BACKGROUND

As the demand for digital transactions has grown, so has the complexity of the systems and the amount of data involved in these transactions. This growth increases the difficulty associated with verifying data compliance.

SUMMARY OF THE DISCLOSURE

In accordance with the present disclosure, disadvantages and problems associated with verifying data compliance may be reduced or eliminated.

According to one embodiment, a system including a memory and processor is provided. The memory stores a plurality of quality rules associated with missing data elements or corrupt elements and a plurality of control rules associated with communicated data elements or processed data elements. The processor receives a request comprising a plurality of parameters and a plurality of data elements. In response to the request, the processor determines, based at least in part upon at least one parameter of the plurality of parameters, that at least one quality rule of the plurality of quality rules should be applied and at least one control rule of the plurality of control rules should be applied. In response to the request, the processor determines, based at least in part upon the at least one parameter and the at least one quality rule, that the request is missing a first data element and that a second data element of the plurality of data elements is corrupt. The processor determines, based at least in part upon the at least one parameter, that a first number of data elements should have been communicated and that a third number of data elements should have been processed. The processor determines, based at least in part upon the at least one control rule, that a second number of data elements were communicated and that that a fourth number of data elements were processed. The second number is less than the first number and the fourth number is less than the third number. The processor generates a report indicating that: the plurality of parameters is missing the first data element, the second data element is corrupt, the first number is less than the second number, and the fourth number is less than the third number.

Technical advantages of certain embodiments of the present disclosure include a reduction in corrupt data across a system. A technical advantage of certain embodiments includes a reduction in data loss across a system. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
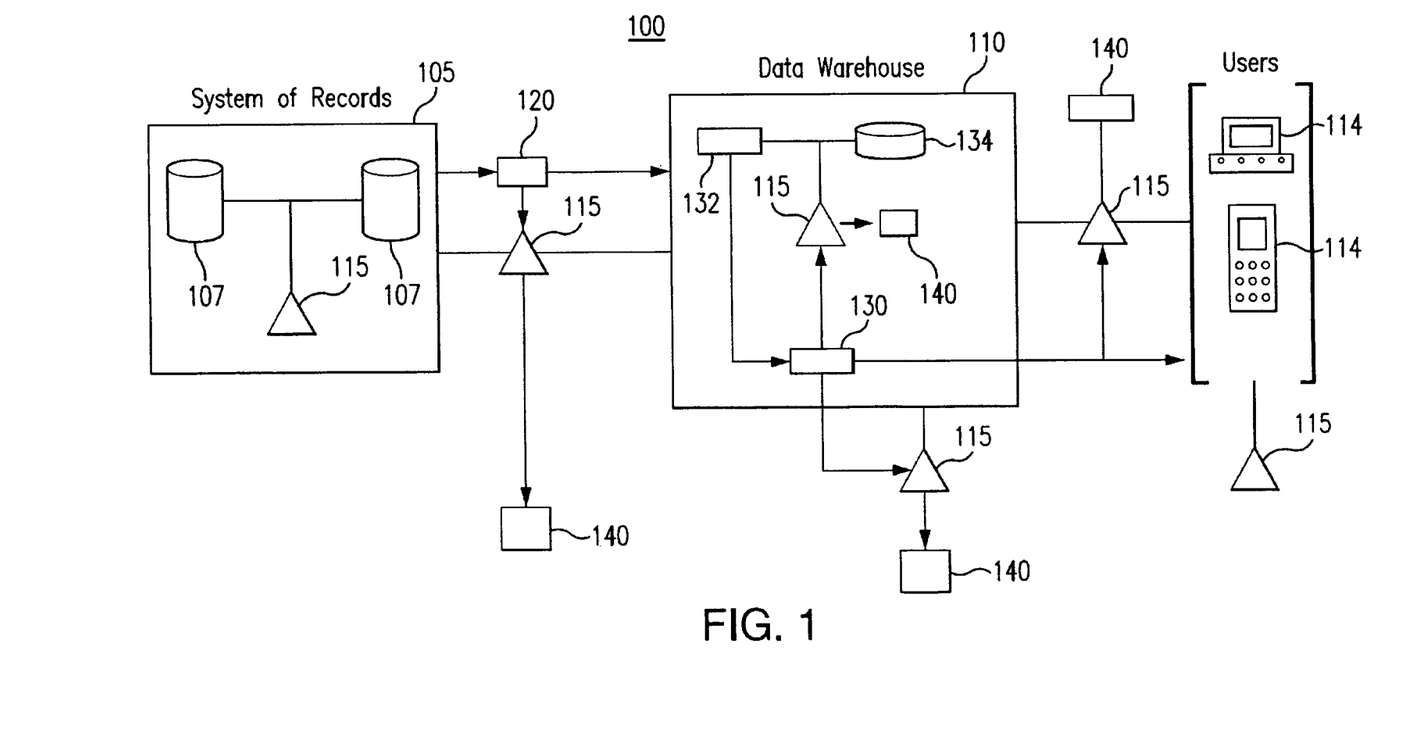
FIG. 1 is a schematic diagram of one embodiment of a system for determining data compliance.
Figure 2:
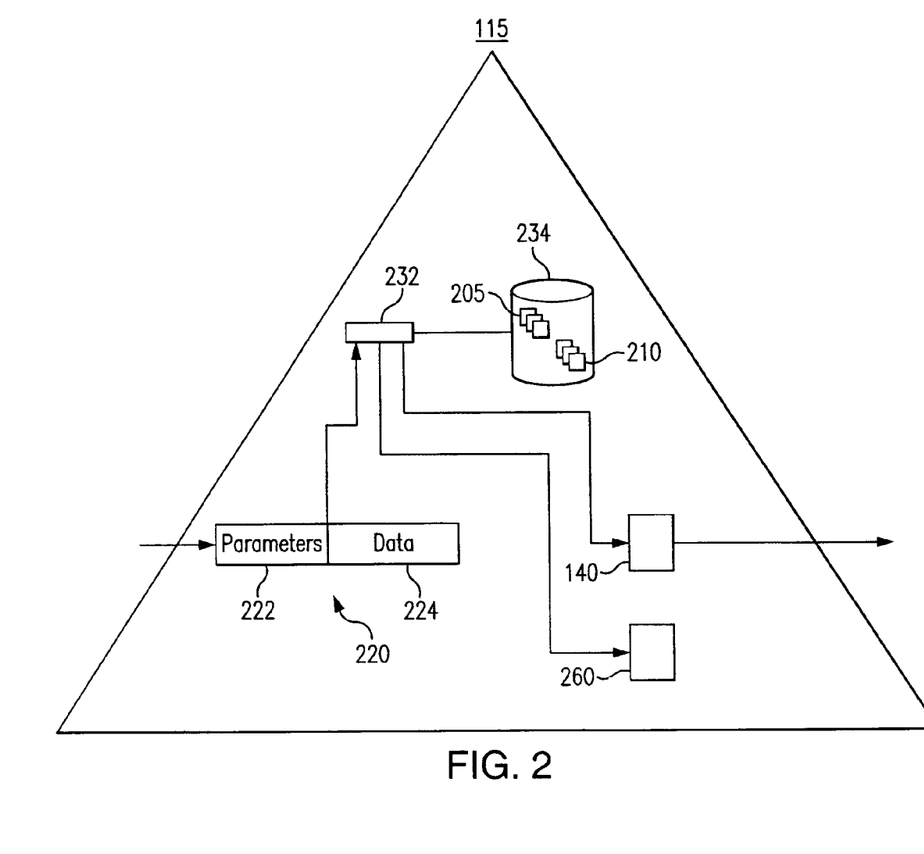
FIG. 2 is a schematic diagram of one embodiment of a compliance processor of the system of FIG. 1.
Figure 3:
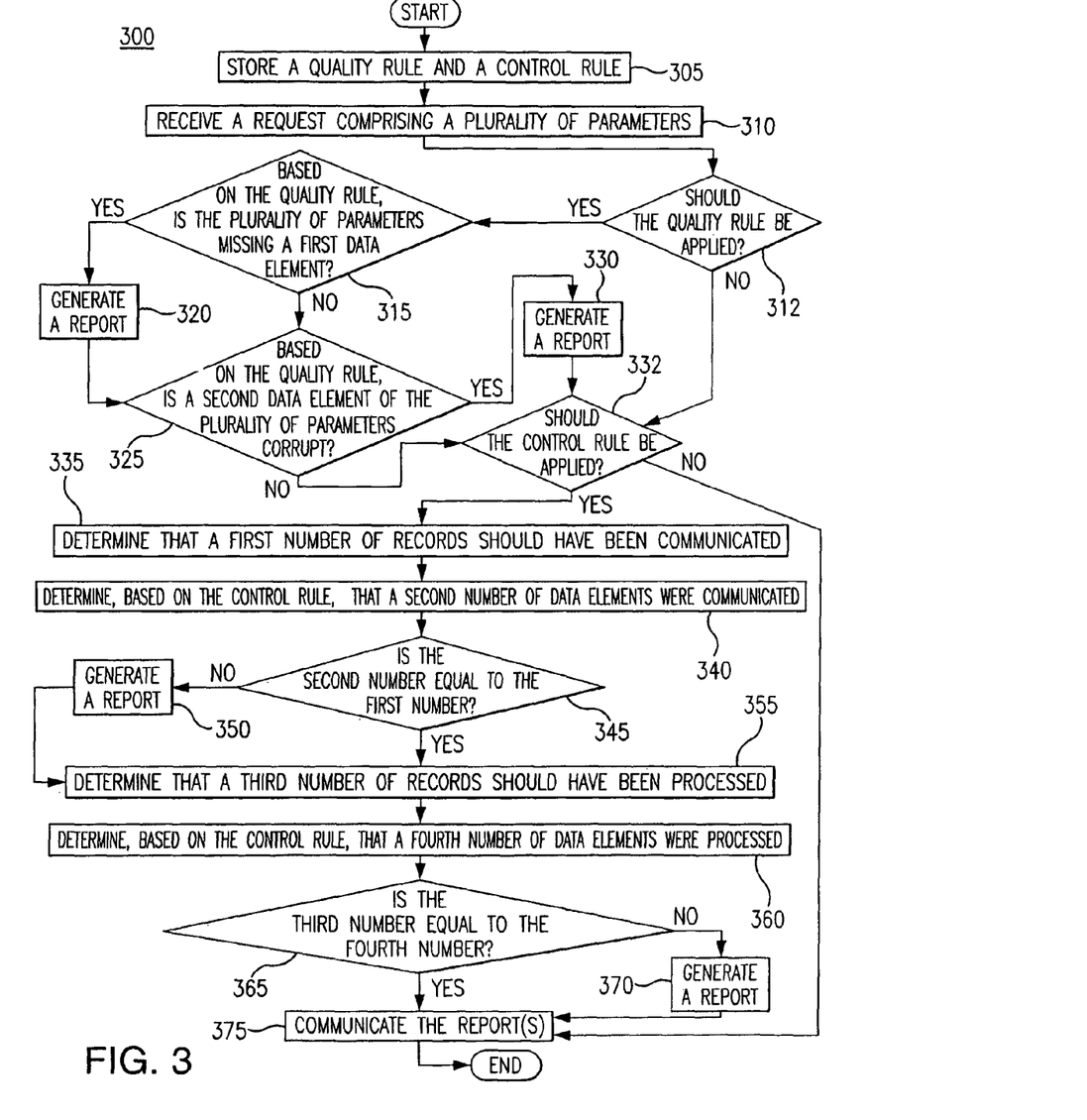
FIG. 3 is a flowchart illustrating a method of determining data compliance using the system of FIG. 1.

Embodiments of the present invention and its advantages are best understood by referring to FIGS. 1 through 3, like numerals being used for like and corresponding parts of the various drawings.

As the demand for digital transactions has grown, so has the complexity of the systems and the amount of data involved in these transactions. This growth increases the difficulty associated with checking data compliance. For example, data may travel through and be processed by several different components of a system before it is presented to an end user. At any point in this process, the data may be corrupted and/or potions of it lost, which negatively affects the presentation to the end user.

The contemplated system may perform a data compliance check at different components of the system so that data compliance can be maintained until the presentation to the end user. The system may include one or more compliance processors that perform these checks.

FIG. 1 is a schematic diagram of one embodiment of a system 100 for determining data compliance. As shown in FIG. 1, system 100 may include a system of records 105, a data warehouse 110, a device 114, and one or more compliance processors 115. Each component of system 100 may be any appropriate application that processes data. In particular embodiments, compliance processors 115 may determine whether data is compliant.

Each component of system 100 may be communicatively coupled to each other. System 100 may include a network that facilitates communication between components of system 100. This disclosure contemplates any suitable network operable to facilitate communication between the components of system 100. The network may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System of records 105 may store information and/or data for use by different components of system 100. System of records 105 may include one or more databases 107 that store the information. For example, system of records 105 may store information associated with user accounts such as usernames, passwords, user ages, and/or social security numbers. System of records 105 may retrieve and communicate data 120 from databases 107. In particular embodiments, system of records 105 may retrieve data 120 in response to receiving a request for data 120. For example, a user may request account information associated with the user. In response to that request, system of records 105 may communicate the user's username, password, age, and social security information. This disclosure contemplates system of records including any appropriate number of databases 107 and any appropriate devices for operating and/or maintaining databases 107.

Data warehouse 110 may include a processer 132 and a memory 134. Processer 132 may be communicatively coupled to memory 134. This disclosure contemplates processer 132 and/or memory 134 performing the functions described herein. In particular embodiments, data warehouse 110 may process data 120 received from system of records 105 to produce processed data 130. For example, system of records 105 may communicate a set of usernames and user ages to data warehouse 110. In response, data warehouse 110 may process the usernames and user ages into a format presentable to an end user. For example, if a user requested that the ages and usernames be grouped into age ranges, data warehouse 110 may group the user ages and corresponding usernames into those age ranges. As another example, if a user requested that the usernames to be sorted alphabetically, data warehouse 110 may sort the usernames and corresponding user ages alphabetically.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 134, a disk, a CD, or a flash drive. In particular embodiments, the software may include an application executable by processor 132 to perform one or more of the functions described herein.

Processor 132 may execute software stored on memory 134 to perform any of the functions described herein. Processor 132 may control the operation and administration of data warehouse 110 and/or compliance processor 115. Processor 132 may include any hardware and/or software that operates to control and process information. Processor 132 may be a programmable logic device, a microcontroller, a microprocessor, any suitable processing device, or any suitable combination of the preceding.

System 100 may include one or more devices 114. In particular embodiments, devices 114 may receive process data 130 from data warehouse 110. Devices 114 may present process data 130 to end users. For example, device 114 may present requested usernames and corresponding user ages in a chart or table or chart. These user ages may be grouped into age ranges. This disclosure contemplates device 114 being any appropriate device for sending and receiving communications over a network. As an example and not by way of limitation, device 114 may be a computer, a laptop, a wireless or cellular telephone, an electronic notebook, a personal digital assistant, a tablet, or any other device capable of receiving, processing, storing, and/or communicating information with other components of system 100. Device 114 may also include a user interface, such as a display, a microphone, keypad, or other appropriate terminal equipment. In some embodiments, an application executed by device 114 may perform the functions described herein. Device 114 may include a compliance processor 115 that determines compliance of data received and/or communicated by device 114.

System 100 may include one or more compliance processers 115. In particular embodiments, compliance processers 115 may be located and/or used by the other components of system 100. For example, system of records 105 may include a compliance processer 115, data warehouse 110 may include a compliance processer 115, and device 114 may include a compliance processor 115. As another example, compliance processors 115 may be located along the communication paths between components of system 100.

Compliance processer 115 may receive requests comprising data elements. Compliance processers 115 may then determine whether the data elements are compliant based on one or more stored rules. In particular embodiments, compliance processor 115 may determine whether data elements are missing and/or corrupt based on a stored quality rule. For example, compliance processor 115 may receive a request that includes a user age. When compliance processor 115 determines that the request includes the user age, compliance processor 115 may retrieve a stored quality rule associated with user ages. The stored quality rule may indicate that a valid user age must be between 0 and 120 years. Based on that quality rule, compliance processor 115 may determine whether the user age is between 0 and 120 years. If the user age is outside that range, compliance processor may determine that the user age is not compliant.

Compliance processor 115 may determine whether the appropriate number of data elements were communicated and/or processed based on a stored control rule in certain embodiments. For example, the request may indicate that six user ages should have been communicated, but include only five user ages. Compliance processor 115 may retrieve a stored control rule and determine, based on the control rule, that the request includes only five user ages. This determination may indicate that data loss occurred during communication. In certain embodiments, compliance processor 115 may determine that data loss occurred during communication based on the control rule. Compliance processor 115, may similarly determine that data loss occurred during processing and/or that certain data elements were not processed based on the control rule. For example, the request may indicate that six user ages should be processed, but compliance processor 115 may determine, based on the control rule, that only five user ages were processed. Compliance processor 115 may examine processed data elements to determine whether five user ages were processed. If fewer than five user ages were processed, then compliance processor 115 may determine that data loss occurred during processing.

In particular embodiments, after compliance processer 115 checks data compliance, compliance processor 115 may generate a report 140 that describes the results of the compliance check. For example, report 140 may indicate whether a user age was not between 0 and 120 years. As another example, report 140 may indicate whether an inappropriate number of data elements were communicated and/or processed. Compliance processor 115 may communicate report 140 to inform a user about the compliance of data in system 100. This disclosure contemplates the one or more compliance processors 115 of system 100 writing into the same report 140 instead of writing into individual reports 140. This disclosure further contemplates the one or more compliance processors 115 generating any appropriate number of reports 140.

Compliance processer 115 may also generate a log that describes the compliance checks that were performed. For example, the log may indicate that compliance processor 115 checked whether data elements were missing and/or corrupt. As another example, the log may indicate that compliance processor 115 checked whether the appropriate number of data elements were communicated and/or processed.

In particular embodiments, compliance processor 115 may reduce the amount of corrupt data across system 100. For example, users may remove and/or correct the corrupt data after compliance processor 115 informs the users of the corrupt data. In certain embodiments, compliance processor 115 may reduce the amount of data lost across system 100. For example, users may correct issues in the communication paths between components of system 100 to remedy data loss after compliance processor 115 informs the users about an inappropriate number of data elements being communicated.

In operation, system 100 may check data compliance at various components of system 100. The following example will be used to help explain the operation of system 100: an end user requests account information for ten accounts, including the usernames, passwords, user ages, and social security numbers associated with these accounts. The end user requests that the account information be grouped according to predefined age ranges. System 100 may retrieve this information, process the information and check compliance throughout the process.

System of records 105 may receive the request for information and retrieve data 120 in response to that request. Data 120 may include the account information for the ten accounts, such a s the usernames, passwords, user ages, and/or social security numbers. System of records 105 may include a compliance processor 115 that determines whether data 120 is compliant before communicating data 120 to another component of system 100. For example, compliance processor 115 may determine whether the social security numbers each contain nine digits. If compliance processor 115 determines that the data is noncompliant, it may mean that the data stored in system of records 105 is noncompliant. System of records 105 may communicate data 120 to data warehouse 110.

While that information is being communicated to data warehouse 110, a compliance processor 115 may check the compliance of that information. Compliance processor 115 may check whether a data element, such as a social security number, is missing from the communicated information. As another example, compliance processor 115 may check whether a data element, such as a social security number, is corrupt. Corrupt data may include data whose value is improper and/or incorrect. For example, compliance processor 115 may check the social security numbers to insure that they each contain nine digits. As another example, compliance processor 115 may determine whether the value of a social security number has not been changed during communication to data warehouse 110. Compliance processor 115 may determine whether the appropriate number of data elements were communicated. For example, compliance processor 115 may determine whether ten usernames, ten passwords, and/or ten social security numbers were communicated to data warehouse 110.

After the compliance check is complete. Compliance processor 115 may generate a report 140 that includes the results of the compliance check. Report 140 may indicate that a social security number is missing, is corrupt, or that an inappropriate number of usernames were communicated. Compliance processor 115 may communicate report 140 to inform the end user about noncompliant data.

Data warehouse 110 may process received data 120 to produce process data 130. For example, data warehouse 110 may arrange the requested account information into age ranges as requested by the end user. Data warehouse 110 may include a compliance processor 115. In particular embodiments, data warehouse 110 may be communicatively coupled to a separate compliance processor 115. Similar to previous examples, compliance processor 115 may check data compliance while data warehouse processes data 120 and generate and/or communicate report 140.

After data warehouse 110 processes data 120 to produce processed data 130, data warehouse 110 may communicate processed data 130 to device 114. During communication, a compliance processor 115 may check the compliance of produced data 130 during communication. A compliance processor 115 in data warehouse 110 or communicatively coupled to data warehouse 110 may also check the compliance of produced data 130 before data warehouse 110 communicates processed data 130.

In particular embodiments, if a compliance processor 115 determines that data is not compliant, system 100 may stop the process and/or retry the process. Using the previous example, if compliance processor 115 determines that a communicated social security number is corrupt, system 100 may stop the process of retrieving, processing, and/or communicating the requested account information to device 114. Furthermore, system 100 may restart the process.

A compliance processor 115 may generate an alert to indicate that data is not compliant in particular embodiments. For example, if a compliance processor 115 determines that a data element is missing, a data element is corrupt, an inappropriate number of data elements were communicated, and/or an inappropriate number of data elements were processed, compliance processor 115 may generate an alert and communicate the alert to notify an end user or an administrator that data is non-compliant.

In particular embodiments, compliance processor 115 may respond to non-compliant data such as by generating an alert, stopping, and/or restarting a process based on threshold levels. For example, instead of stopping and/or restarting a process if merely one data element is corrupt, compliance processor 115 may determine an alert level based on the non-compliant data. For example, compliance processor 115 may determine an alert level based on the determination that a data element is missing or corrupt and/or a determination that the number of communicated and/or processed data elements is inappropriate.

Compliance processor 115 may then compare the alert level with a stored threshold level and then based on that comparison, stop or restart the process. For example, compliance processor 115 may stop the process and deny the initial request from the end user because the alert level exceeds the threshold level. In contrast, if the alert level does not exceed the threshold level, compliance processor 115 may continue processing the request. In this manner, compliance processor 115 need not communicate an alert for every instance of non-compliant data, but may respond when the amount of non-compliant data exceeds a threshold.

FIG. 2 is a schematic diagram of one embodiment of a compliance processor 115 of the system 100 of FIG. 1. As illustrated in FIG. 2, compliance processor 115 may include a processor 232 and a memory 234 communicatively coupled to processor 232. This disclosure contemplates processer 232 and/or memory 234 performing the functions described herein. Processor 232 and memory 234 may be analogous and/or similar to processor 132 and memory 134. In particular embodiments, processor 232 and memory 234 may be embodied in a separate component of system 100. For example, processor 232 and memory 234 may be processor 132 and memory 134 of data warehouse 110.

Compliance processor 115 may store quality rules 205 and control rules 210. Compliance processor 115 may use quality rules 205 and control rules 210 to determine whether data is compliant. Quality rules 205 represent rules that provide instructions on whether one or more data elements are missing and/or corrupt. For example, a quality rule 205 may indicate a particular range in which a valid user age should fall. As another example, a quality rule 205 may indicate that a particular portion of a request should indicate the number of usernames contained in the request. Control rules 210 represent rules that provide instructions on whether the appropriate number of data elements were communicated and/or processed. For example, a control rule 210 may indicate that a particular portion of a request should indicate the number of data elements communicated in the request. As another example, a control rule 210 may indicate that the number of data elements to be processed should be equal to the number of data elements that were received in a request.

Compliance processor 115 may receive a request 220. Request 220 may include parameters 222 and data 224. Parameters 222 may indicate the type of request 220 and the type(s) of data 224. For example, if an end user has requested the account information associated with ten user accounts, parameters 222 may indicate that request 220 is a retrieval or process type request and that data 224 includes usernames, passwords, and/or social security numbers. Parameters 222 may indicate the number of elements that should be included in data 224. For example, parameters 222 may indicate that there should be ten user ages included in data 224. Parameters 222 may indicate the number of communicated elements in data 224. For example, parameters 222 may indicate that twenty data elements were communicated. Based on parameters 222, compliance processer 115 may determine the types of compliance checks to perform on data 224.

Data 224 may include a plurality of data elements. For example, data 224 may include usernames and passwords for ten accounts. In that example, data 224 includes twenty data elements if each of the ten accounts is associated with only one username and password. This disclosure contemplates data 224 including any appropriate number of data elements. In particular embodiments, data 224 is compliant if data 224 includes the appropriate number of data elements and if each data element is not corrupt.

As mentioned above, compliance processor 115 may use quality rules 205 to determine whether data 224 is compliant. For example, compliance processor 115 may use quality rule 205 to determine whether data 224 is missing a data element. In a specific example, parameters 222 may indicate that data 224 should include ten social security numbers. Using quality rules 205, compliance processor 115 may examine data 224, identify the social security numbers, and determine whether there are ten social security numbers. As another example, compliance processor 115 may use quality rules 205 to determine whether data 224 includes a corrupt data element. In a specific example, parameters 222 may indicate that data 224 should include ten user ages.

Compliance processor 115 may determine the appropriate quality rule(s) 205 to apply based on parameters 222 and data 224. For example, parameters 222 may indicate that data 224 includes user ages. Compliance processor 115 may then, determine that a quality rule 205 that indicates the valid range of user ages should be applied. As another example, parameters 222 may indicate that data 224 includes account information associated with ten accounts. Compliance processor 115 may then determine that a quality rule 205 associated with determining the appropriate number of social security numbers associated with ten accounts. For example, the quality rule 205 may indicate that fewer than ten social security numbers may be communicated because not all users provide a social security number.

Compliance processor 115 may examine parameters 222 and data 224, determine the appropriate quality rule(s) 205 to apply, identify the user ages, and determine whether the user ages are within a particular age range (e.g., 0 to 120 years) based on the determined quality rule(s) 205. Using the previous example of FIG. 1, compliance processor 115 may determine from parameters 222 that quality rules 205 should be applied. Compliance processor 115 may then determine, based on quality rules 205 that data 224 is missing a username from the requested user accounts. Compliance processor 115 may also determine, based on quality rules 205, that a social security number of the requested accounts is corrupt. Compliance processor 115 may also determine, based on the type of request 220, that the social security number was corrupted during communication rather than processing. For example, the type of request 220 may indicate that request 220 is being communicated from system of records 105 to data warehouse 110. Compliance processor 115 may determine that because the social security number is corrupted and because request 220 is being communicated, the social security number was corrupted during communication. This disclosure contemplates compliance processor 115 determining that any data element is corrupted during any appropriate process based on the type of request 220.

Compliance processor 115 may also use control rules 210 to determine whether data 224 is compliant. For example, compliance processor 115 may use control rules 210 to determine whether the appropriate number of data elements were communicated and/or processed. Parameters 220 may indicate that data 224 should include the usernames, passwords, user ages, and social security numbers for ten accounts. Referring to the previous example, using control rule 210, compliance processor 115 may examine data 224 and determine whether it contains forty data elements (consistent with 4 data elements per requested account). If data 224 includes fewer than forty data elements, then compliance processor 115 may determine that certain data elements were lost during communication. As another example, parameters 222 may indicate that data 224 has been processed and should include account information associated with ten accounts. Based on control rule 210, compliance processor 115 may examine data 224 and determine it contains forty data elements (consistent with 4 data elements per requested account): If data 224 includes fewer than 40 data elements, compliance processor 115 may determine that certain data elements were not processed.

Compliance processor 115 may generate report 140 to indicate the results of the compliance check. For example, report 140 may indicate that data 224 is missing data elements and/or includes corrupt data elements. Report 140 may also indicate that an inappropriate number of data elements were communicated and/or processed. Compliance processor 115 may communicate report 140 to inform a user about the noncompliant data. Report 140 may be communicated periodically rather than after every compliance check.

Compliance processer 115 may generate a log 260 that indicates the types of compliance checks that were performed by compliance processor 115. For example, log 260 may indicate that compliance processer 115 checked whether data 224 was missing data elements and/or included corrupt data elements. Log 260 may also indicate that compliance processer 115 checked whether an appropriate number of data elements were communicated and/or processed.

Compliance processor 115 may change quality rules 205 and/or control rules 210 in particular embodiments. Compliance processor 115 may receive a request to change a quality rule 205 and/or a control rule 210. In response to the request, compliance processor 115 may change quality rule 205 and/or control rule 210. For example, compliance processor 115 may receive a request from a user to change a quality rule 205 associated with user ages. The request may indicate that a valid user age should be between 0 and 100 years instead of 0 and 120 years. Compliance processor 115 may change quality rule 205 to specify that a valid user age should be between 0 and 100 years in response to the request. As another example, compliance processor 115 may receive a request to change quality rules 205 to include a new quality rule 205 associated with user genders. The request may indicate that a valid user gender should be either "male" or "female." Compliance processor 115 may change quality rules 205 to include a new quality rule 205 to specify that a valid user gender should be either "male" or "female." In this manner, compliance processer 115 may be adapted to perform any appropriate compliance check.

FIG. 3 is a flow chart illustrating a method 300 of determining data compliance using the system 100 of FIG. 1. Compliance processor 115 may perform method 300. In particular embodiments, method 300 may reduce the amount of corrupt data across system 100 and/or the amount of data loss across system 100.

Compliance processor 115 may begin by storing a quality rule and a control rule in step 305. In step 310, compliance processor 115 may receive a request comprising a plurality of parameters. The parameters may include information about data elements of the request. In step 312, compliance processor 115 may determine whether the quality rule should be applied. In particular embodiments, compliance processor 115 may make this determination based on the plurality of parameters. If the quality rule should not be applied, compliance processor may continue to step 332.

If the quality rule should be applied, compliance processor 115 may determine whether the request is missing a first data element in step 315. In particular embodiments, compliance processer 115 may make this determination based on the quality rule. If compliance processer 115 determines that the first data element is missing, compliance processer 115 may proceed to step 320 to generate a report indicating that the first data element is missing. Otherwise, compliance processer 115 may proceed to step 325.

Compliance processor 115 may determine whether a second data element is corrupt in step 325. In particular embodiments, compliance processor 115 may make this determination based on the quality rule. If compliance processor 115 determines that the second data element is corrupt, compliance processor 115 may proceed to step 330 to generate a report indicating that the second data element is corrupt. Otherwise, compliance processor 115 may proceed to step 332.

In step 332, compliance processor 115 may determine whether the control rule should be applied. In particular embodiments, compliance processor 115 may make this determination based on the plurality of parameters. If compliance processor determines that control rule should not be applied, compliance processor may continue to step 375.

If compliance processor 115 determines that the control rule should apply, compliance processor 115 may continue to step 335 to determine that a first number of data elements should have been communicated. In particular embodiments, compliance processor 115 may make this determination based on the plurality of parameters. In step 340, compliance processor 115 may determine, based on the control rule, that a second number of data elements were communicated. In step 345, compliance processor 115 may compare the first number and the second number to determine whether the second number is equal to the first number. If the first number is not equal to the second number, compliance processor 115 may proceed to step 350 to generate a report indicating that the second number is not equal to the first number. Otherwise, compliance processor 115 may proceed to step 355.

Compliance processor 115 may determine that a third number of data elements should have been processed in step 355. In particular embodiments, compliance processor 115 may make this determination based on the plurality of parameters. In step 360, compliance processor 115 may determine, based on the control rule, that a fourth number of data elements were processed. In step 365, compliance processor 115 may compare the third number and the fourth number to determine whether the third number is equal to the fourth number. If the third number is not equal to the fourth number, compliance processor 115 may proceed to step 370 to generate a report indicating that the third number is not equal to the fourth number. Otherwise, compliance processor 115 may proceed to step 375 to communicate the report(s). This disclosure contemplates compliance processor 115 generating any number of reports indicating any appropriate number of issues. For example, compliance processor may generate one report to indicate that the first data element is missing and that the second data element is corrupt.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system comprising:
a memory operable to store:
   a plurality of quality rules associated with missing data elements or corrupt data elements; and
   a plurality of control rules associated with communicated data elements or processed data elements; and
a processor communicatively coupled to the memory and operable to:
   receive a request comprising a plurality of parameters and a plurality of data elements;
   in response to the request, determine, based at least in part upon at least one parameter of the plurality of parameters, to apply at least one quality rule of the plurality of quality rules and at least one control rule of the plurality of control rules;
   in response to the request, determine, based at least in part upon the at least one parameter and the at least one quality rule, that the request is missing a first data element;
   in response to the request, determine, based at least in part upon the at least one parameter and the at least one quality rule, that a second data element of the plurality of data elements is corrupt;
   determine, based at least in part upon the at least one parameter, to communicate a first number of data elements;

determine, based at least in part upon the at least one control rule, that a second number of data elements were communicated, wherein the second number is less than the first number;

determine, based at least in part upon the at least one parameter, to process a third number of data elements;

determine, based at least in part upon the at least one control rule, that a fourth number of data elements were processed, wherein the fourth number is less than the third number;

generate a report indicating that:
the plurality of parameters is missing the first data element;
the second data element is corrupt;
the second number is less than the first number; and
the fourth number is less than the third number; and generate a log indicating that:
the request was checked for missing data elements;
the request was checked for corrupt data elements;
a number of communicated data elements was checked; and
a number of processed data elements was checked.

2. The system of claim 1, wherein the processor is further operable to:
generate an alert indicating that:
the request is missing the first data element;
the second data element is corrupt;
the second number is less than the first number; and
the fourth number is less than the third number; and
communicate the alert.

3. The system of claim 1, wherein:
the memory is further operable to store a threshold level; and
the processor is further operable to:
determine an alert level based at least in part upon:
the determination that the request is missing a first data element;
the determination that the second data element is corrupt;
a determination that the second number is less than the first number; and
a determination that the fourth number is less than the third number;
compare the alert level to the threshold level; and
deny the request based at least in part upon the comparison of the alert level and the threshold level.

4. The system of claim 1, wherein the processor is further operable to determine, based at least in part upon the at least one quality rule, that the second data element exceeds a threshold.

5. The system of claim 1, wherein the processor is further operable to determine that at least one of a number of missing data elements and a number of corrupt data elements exceeds a threshold.

6. The system of claim 1, wherein the processor is further operable to change at least one of the at least one quality rule and the at least one control rule.

7. The system of claim 1, wherein the processor is further operable to determine, based at least in part upon the at least one parameters, that the second data element was corrupted during communication.

8. The system of claim 1, wherein the plurality of parameters indicate the first number and the third number.

9. A method comprising:
storing, by a memory, a plurality of quality rules associated with missing data elements or corrupt data elements; and storing, by the memory, a plurality of control rules associated with communicated data elements or processed data elements; and receiving a request comprising a plurality of parameters and a plurality of data elements;

in response to the request, determining, by a processor, based at least in part upon at least one parameter of the plurality of parameters, to apply at least one quality rule of the plurality of quality rules and at least one control rule of the plurality of control rules;

in response to the request, determining, by the processor, based at least in part upon the at least one parameter and the at least one quality rule, that the request is missing a first data element;

in response to the request, determining, by the processor, based at least in part upon the at least one parameter and the at least one quality rule, that a second data element of the plurality of data elements is corrupt;

determining, by the processor, based at least in part upon the at least one parameter, to communicate a first number of data elements;

determining, by the processor, based at least in part upon the at least one control rule, that a second number of data elements were communicated, wherein the second number is less than the first number;

determining, by the processor, based at least in part upon the at least one parameter, to process a third number of data elements;

determining, by the processor, based at least in part upon the at least one control rule, that a fourth number of data elements were processed, wherein the fourth number is less than the third number; and generating a report indicating that:
the plurality of parameters is missing the first data element;
the second data element is corrupt;
the second number is less than the first number; and
the fourth number is less than the third number; and generating a log indicating that:
the request was checked for missing data elements;
the request was checked for corrupt data elements;
a number of communicated data elements was checked; and
a number of processed data elements was checked.

10. The method of claim 8, further comprising:
generating an alert indicating that:
the request is missing the first data element;
the second data element is corrupt;
the second number is less than the first number; and
the fourth number is less than the third number; and
communicating the alert.

11. The method of claim 8, further comprising:
storing, by the memory, a threshold level;
determining, by the processor, an alert level based at least in part upon:
the determination that the request is missing a first data element;
the determination that the second data element is corrupt;
a determination that the second number is less than the first number; and
a determination that the fourth number is less than the third number;
comparing, by the processor, the alert level to the threshold level; and denying, by the processor, the request based at least in part upon the comparison of the alert level and the threshold level.

12. The method of claim 8, further comprising determining, by the processor, based at least in part upon the at least one quality rule, that the second data element exceeds a threshold.

13. The method of claim 8, further comprising determining that at least one of a number of missing data elements and a number of corrupt data elements exceeds a threshold.

14. The method of claim 8, further comprising changing at least one of the at least one quality rule and the at least one control rule.

15. The method of claim 8, further comprising determining, based at least in part upon the at least one parameters, that the second data element was corrupted during communication.

16. The method of claim 8, wherein the plurality of parameters indicate the first number and the third number.

* * * * *